United States Patent Office 3,819,834
Patented June 25, 1974

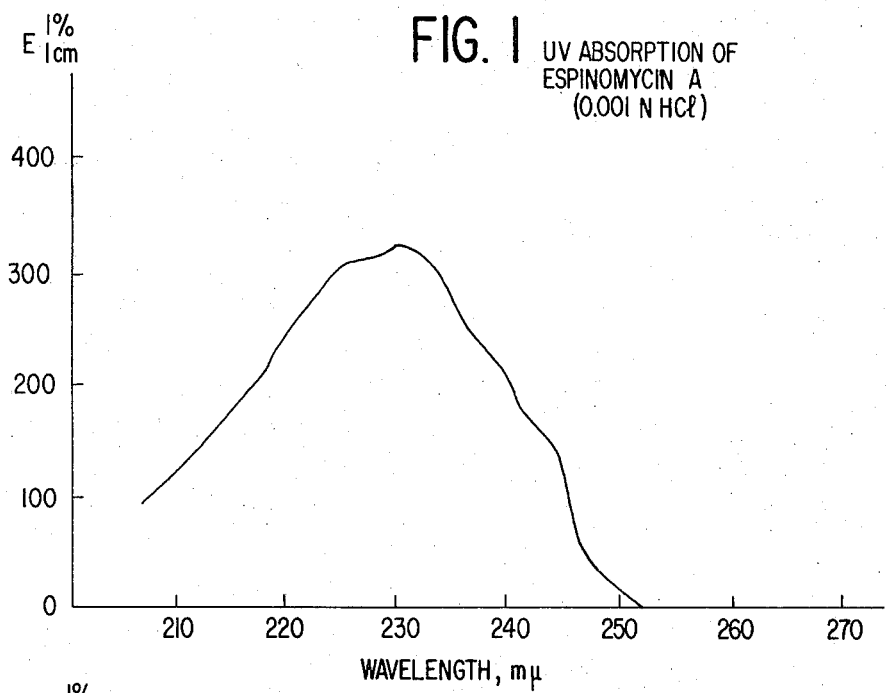
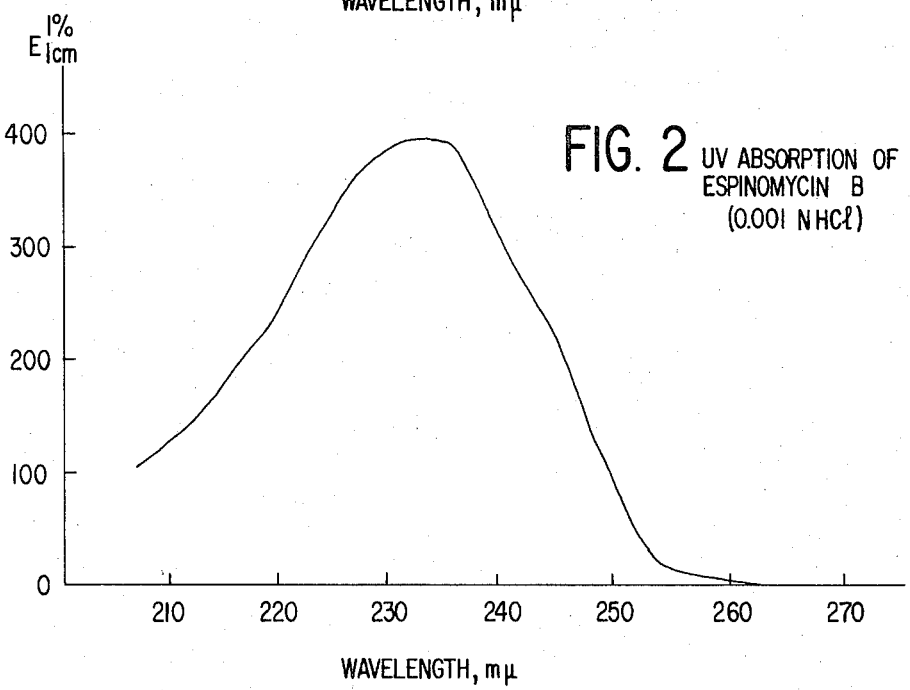

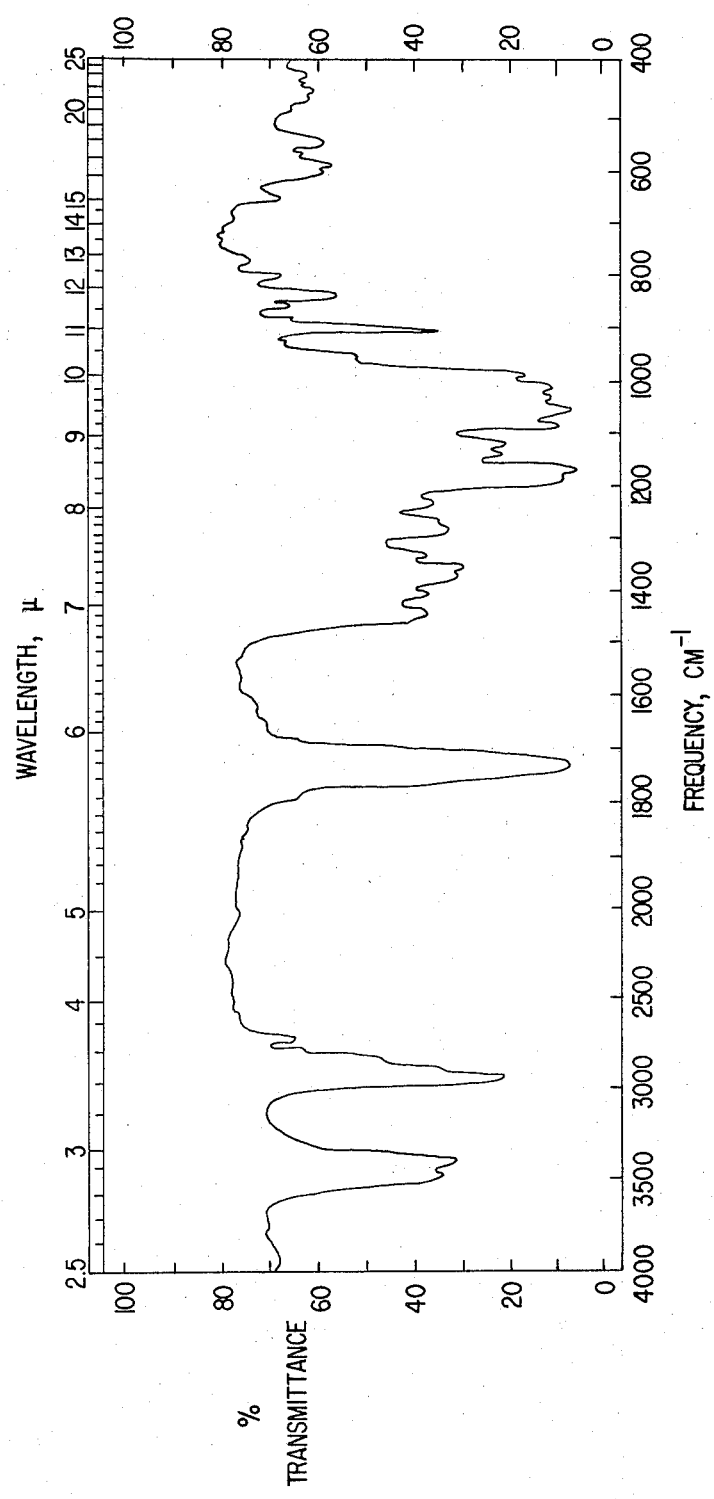
FIG. 3 INFRA-RED SPECTRUM OF ESPINOMYCIN A

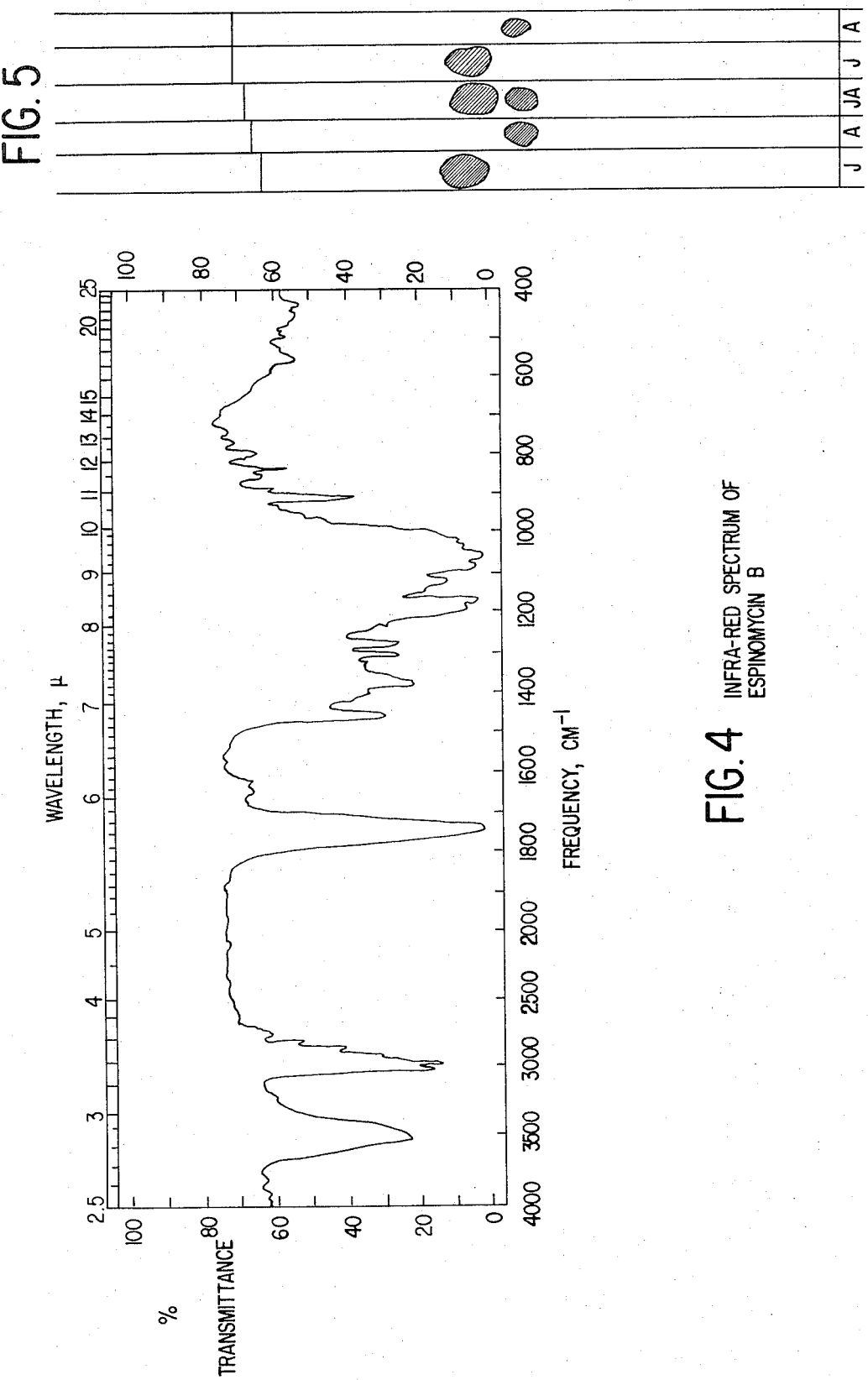
FIG. 4 INFRA-RED SPECTRUM OF ESPINOMYCIN B

3,819,834
ESPINOMYCIN ANTIBIOTICS AND METHODS OF PREPARING SAME
Sumio Umezawa, Tokyo, Isamu Machida, Hatogaya, Susumu Shiotsu and Kimio Yokota, Urawa, Shigehide Makino, Tokyo, Gaku Kawaguchi, Gyoda, and Kazutoshi Honda, Tokyo, Japan, assignors to Meji Seika Kaisha, Ltd., Tokyo, Japan
Continuation of abandoned application Ser. No. 62,055, Aug. 7, 1970. This application Apr. 18, 1972, Ser. No. 245,178
Int. Cl. A61k 21/00
U.S. Cl. 424—120
8 Claims

ABSTRACT OF THE DISCLOSURE

A new group of antibiotics, the Espinomycins, are described along with methods for obtaining them from *Streptomyces fungicidicus varietus espinomyceticus*. The antibiotics belong to the macrolide group of antibiotics, and show a high activity against gram-positive organisms. They are suitable for oral administration, and show a low toxicity to the host.

This is a continuation of application Ser. No. 62,055 filed Aug. 7, 1970, now abandoned.

BACKGROUND OF THE INVENTION

Field of the invention

The present invention relates generally to new antibiotics and methods of producing them. More particularly, the present invention pertains to new and useful antibiotics called Espinomycins, and methods of producing them from a newly isolated organism, *Streptomyces fungicidicus varietus espinomyceticus*.

Description of the prior art

Many antibiotics have been reported belonging to the macrolide group of antibiotics, such as Erythromycin, Carbomycin, Oleandomycin, Leucomycin, Spiramycin, Josamycin, etc. All of these antibiotics are characterized by having a distinct absorption on infrared spectra at around 1720 cm.$^{-1}$ based on the carbonyl group of a macro cyclic lactone ring. Those concerned with the development of antibiotics effective against gram-positive bacteria have long recognized the need for antibiotics which are capable of oral administration due to a high rate of transfer into the bloodstream, coupled with a low toxicity. The present invention fills this need.

SUMMARY OF THE INVENTION

The general purpose of this invention is to provide new and useful antibiotics called Espinomycins, and a method for preparing them. Espinomycin is the name given to the new group of antibiotics manufactured by the method of this invention. Among them, at least two types of these antibiotics have been isolated which have been designated Espinomycin A or Espinomycin B. As used in this specification, the word "Espinomycin" is intended to mean either Espinomycin A, Espinomycin B, or combinations thereof. The Espinomycins of this invention are prepared by the fermentation of *Streptomyces N–18–90*.

The *Streptomyces N–18–90* strain was isolated for the first time from a soil sample collected in Ibaragi City, Osaka Prefecture, Japan, by the present inventors. This organism strain was deposited with the Fermentation Research Institute, Agency of Industrial Science and Technology, Inage City, Chiba Prefecture, Japan, and given Acceptance No. 351. The N–18–90 strain was classified as a variant of *Streptomyces fungicidicus* and was named *Streptomyces fungicidicus* var. *espinomyceticus*. This strain has also been deposited with the American Type Culture Collection in the United States, and has been given ATCC Acceptance No. 21574.

It is an object of this invention to provide a new member of antibiotics belonging to the macrolide antibiotics.

Another object of this invention is to provide a method for producing Espinomycin antibiotics.

A further object of the invention is to provide methods of separating crude mixtures of Espinomycin into Espinomycin A and Espinomycin B.

Still another object of this invention is to provide a new type of antibiotic which exhibits a high antibiotic activity against gram-positive bacteria.

Another object of this invention is to provide an antibiotic exhibiting high activity against gram-positive bacteria which has a low toxicity to the host.

Yet an additional object of this invention is to provide a new antibiotic exhibiting a favorable absorption from the digestive tract, which is therefore suitable for oral administration.

The foregoing and other objects are obtained in accordance with the present invention which provides a unique strain of *Streptomyces fungicidicus*, named *Streptomyces fungicidicus* var. *espinomyceticus*, and a method for obtaining and purifying antibiotic substances produced by this organism.

BRIEF DESCRIPTION OF THE DRAWINGS

These and other objects, features, and advantages of the invention will become more fully apparent to those skilled in the art from the following description of an illustrative embodiment of the invention, as further illustrated in the annexed Drawings, in which:

FIG. 1 is the ultraviolet absorption spectrum of Espinomycin A in 0.001 N HCl;

FIG. 2 is the ultraviolet absorption spectrum of Espinomycin B in 0.001 N HCl;

FIG. 3 is the infrared absorption spectrum of Espinomycin A measured in KBr tablets;

FIG. 4 is the infrared absorption spectrum of Espinomycin B measured in KBr tablets; and FIG. 5 is a silica gel thin layer chromatogram of Espinomycin A and Josamycin, schematically illustrated.

DESCRIPTION OF ILLUSTRATIVE EMBODIMENTS

The Espinomycins of this invention may be prepared by the fermentation of *Streptomyces N–18–90*. While Espinomycin has the same maximum absorption by ultraviolet spectroscopy at around 232 m$\mu$ as do some of the known macrolide group of antibiotics, the physicochemical and biological properties of Espinomycin are entirely different from those of the above antibiotics, as is disclosed hereinafter.

Mycological Characteristics of *Streptomyces Fungicidicus* Varietus *Espinomyceticus*

Morphological features

According to microscopic observation of the espinomycin-producing strain grown on starch ammonium phosphate agar, an aerial mycelium is observed having a long main axis. No whorl was observed, but one or two branches were grown from several parts of the aerial hyphae. The tip of the sporophore often forms an open spiral, and the spore chain looks berry-like due to the involute tight spiral. Typically, there are more than 10 spores. According to electron microscopy, the size of the spore is irregular, the average being about 1 x 0.8 microns, and the shape of the spore being typically spherical to oval. Many longer spines are observed on the surface of the spore.

Culture Characteristics on Various Media

1. Glucose nitrate agar (glucose-Czapek's agar)

Colorless growth, white, dense aerial mycelium, sometimes becoming faintly purplish tinge. Reverse gradually purplish shade, later dull purple to purplish brown. Light purple to light brownish purple pigment diffuses into the agar.

2. Glycerine nitrate aga (glycerine Czapek's agar)

Similar to (1) above, but generally only a weak pigmentation.

3. Glucose asparagine agar

Off-white to pale brown growth. Aerial mycelium sparse, sometimes becoming white powdery. Pigment mostly absent.

4. Glycerine calcium malate agar

Thin, colorless growth. Aerial mycelium scant. Pigment absent.

5. Glucose nitrate solution (glucose Czapek's solution)

Colorless small colonies in bottom of tube, with small colonies on liquid surface. Pigment absent.

6. Starch agar (starch ammonium sulfate agar)

Off-white growth. Aerial mycelium abundant, white in initial stage, later grayish shade with various tones. (This shade is caused by dense sporulation.) Reverse, later produces dull reddish insoluble pigment partially.

7. Peptone meat extract agar (nutrient agar)

Cream-colored growth. Aerial mycelium sparse, white. No pigment.

8. Glucose nutrient agar

Thick, wrinkled growth. Aerial mycelium chalky white. No pigment.

9. Cellulose medium

No growth is observed.

10. Nutrient broth and glucose nutrient broth

Colorless flaky sediment. No pigment.

11. Gelatin stab

Colorless growth on surface, poor growth in medium. No pigment.

12. Peptone glucose agar

Cream-color growth. Aerial mycelium white. No pigment.

13. Blood agar

Moist, brown to reddish brown growth. No or very scant aerial mycelium.

14. Loeffler's coagulated serum

Moist, cream-colored growth. No aerial mycelium. No pigment.

15. Litmus milk

Off-white surface ring. Coagulation and slow peptonization. pH unchanged.

16. Egg medium

Pale brown growth, later wrinkled. Aerial mycelium white covering the whole surface, later aerial mycelium disappeared gradually. No pigment.

17. Bennet agar

Aerial mycelium abundant, white, later usually becoming faintly purplish tinge. Reverse dull purple to reddish brown with after-partial pigmentation. Light brown pigment diffuses into the agar.

18. Potato plug

Thick light brown growth. Aerial mycelium white, sometimes becoming faintly purplish tinge. Plug color unchanged.

19. Carrot plug

Off-white to light brown, good growth. Aerial mycelium powdery white. No darking of plug.

The following physiological properties have been noted which are characteristic of *Streptomyces fungicidicus* var. *espinomyceticus*:

1. The organism is aerobic, showing good growth over a pH range of from 5 to 9. No noticeable difference in growth was observed over the temperature range of 27° C. to 37° C.
2. Liquefaction of gelatin: Weak or none.
3. Hydrolysis of starch: Positive.
4. Tyrosinase reaction: Negative.
5. Peptonization of milk: Positive.
6. Nitrate reduction: Negative.
7. Cellulolytic reaction: Negative.
8. Chromogenecity action: Negative.
9. Hemolysis: Positive.
10. Liquefaction of coagulated serum: Negative.

The carbon utilization properties of *Streptomyces fungicidicus* var. *espinomyceticus* are shown in Table 1 tested on Pridham and Gottlieb's medium.

TABLE 1

| D-glucose | + | Maltose | ± | Raffinose | − |
|---|---|---|---|---|---|
| D-mannitol | + | D-sorbitol | ± | D-xylose | − |
| Inositol | + | Salicin | ± | Sodium citrate | − |
| D-galactose | + | L-arabinose | − | Sucrose | − |
| D-fructose | + | Rhamnose | − | | |
| D-mannose | + | Lactose | − | | |

Code: + positive utilization, ± doubtful utilization, − negative utilization.

In summary, for the purpose of systematic classification on the basis of the above mycological properties, the spore surface shows a spiny structure, while the spore-forming hyphae show a spiral form. There is no chromogenic activity observed on organic media. Although the adhesion of white aerial mycelium is observed on various media, it shows a grayish tone in consequence of abundant sporulation.

These features of the N–18–90 strain, when compared with the data on known Streptomyces species such as found in *The Actinomyces*, Vol. 2, written by Waksman; *International Journal of Systematic Bacteriology*, Vol. 18, Nos. 2 and 4, and other technical journals on antibiotics and microorganism, such as *The Journal of Antibiotics* (Japan); *Journal of Bacteriology*, etc., are identical with the reported characteristics of *Streptomyces fungicidicus*, Okami et al.

Auxiliary criteria on classification such as the physiological properties and sugar utilization are also nearly indentical with that given for *Streptomyces fungicidicus* in the *Journal of Antibiotics* (Japan), Vol. A7, P.99. However, in comparing details of growth in various media, the N–18–90 strain differs from *Streptomyces fungicidicus* in showing a slightly purplish tinge of aerial mycelium, in diffusion of purplish pigments into the agar and the reverse side of growth, seemingly due to the formation of insoluble or partially-soluble pigments in various media, and also importantly in that the N–18–90 strain produces Espinomycin, an antibiotic substance belonging to macrolide derivatives, which is not known to be a product of *Streptomyces fungicidicus*.

The present inventors, therefore, considered it reasonable that the N–18–90 strain be categorized as a new varient of *Streptomyces fungicidicus* and accordingly have named in *Streptomyces fungicidicus varietus espinomyceticus* nov. var.

As is well known, an actinomyces is apt to change in its properties on media, whether natural or artificial.

Therefore, the mycological characteristics of the organism used in this invention, *Streptomyces fungicidicus* var. *espinomyceticus* nov. var. are not necessarily permanent. Accordingly, it is contemplated within the scope of this invention, i.e., the manufacture of the new antibiotic Espinomycin, that the *Streptomyces fungicidicus* var. *espinomyceticus* contains the N–18–90 strain, as well as the artificial mutant strains, either of which can be applicable to this invention.

The cultivation of *Streptomyces fungicidicus* var. *espinomyceticus* according to this invention can be performed by the application of generally known techniques for the cultivation of the Streptomyces. As the nutritional sources in media for this strain, well known nutrients which are conventionally used in the cultivation of Streptomyces can be employed. For example, as typical known nitrogen sources there may be used peptone, meat extract, dried yeast, cornsteep liquor, soybean meal, cottonseed meal, peanut meal, protein-hydrolyzed substances, inorganic nitrates, or inorganic ammonium salts. Suitable carbon sources are carbohydrates such as starch, glucose, dextrin, glycerol, and fructose, as well as oils and fats. Suitable inorganic salts are sodium chloride, potassium chloride, phosphates, magnesium sulfates, and calcium carbonates. Each of the nitrogen sources, carbon sources, and inorganic salts can be used alone or in an appropriate combination. If necessary, trace metallic salts may be added, and well known antifoam agents such as silicon oil and liquid paraffin may be used.

As a means of cultivation, either a surface culture or a shaking culture can be employed. However, the submerged culture method with aeration and agitation is preferable for large scale production. In such cases, culture conditions such as temperature, time, or pH of the media can be appropriately selected by those skilled in the art for the growth of the Espinomycin-producing strain to maximize the amount of Espinomycin produced. For example, a medium composed of 2% soybean meal, 1.5% starch, 0.5% glucose, 0.1% peptone, 0.1% dried yeast, 0.2% sodium nitrate, 0.3% NaCl, and 0.2% calcium carbonate is adjusted to a pH of 5 to 8, and sterilized. If a preculture prepared from Streptomyces or vegetative mycelia of *Streptomyces fungicidicus* var. *espinomyceticus* is innoculated into this medium and cultivated with aeration and agitation at 25° C. to 33° C. for two to four days. Espinomycin can be accumulated in the cultured broth.

The accumulated Espinomycin may be extracted and isolated by utilization of conventional methods, either separately or in combination, or repeatedly, by utilizing the herein-disclosed physicochemical properties of Espinomycin. Furthermore, at least one of Espinomycin A and B, or mixtures thereof, can be refined and yielded at the desired purity. That is, the harvested broth contains the solid material, which can be removed by well known methods. For example, the harvested broth is filtered after slightly acidic adjustment. The filtrate thus obtained contains Espinomycin, which may be extracted under neutral or weakly alkaline conditions by means of various organic solvents which are immiscible with water, such as ethyl acetate, butyl acetate, amyl acetate, chloroform, benzene, methyl isobutyl ketone, butyl alcohol, or the like. The solvents may be used individually, or in combination.

Alternatively, without prior separation, the whole broth including the solid material such as the mycelium, can be used for the direct extraction of Espinomycin into these organic solvents. Espinomycin, after extracting with various organic solvents, can, if necessary, be concentrated under reduced pressure and extracted with an acidic water. Then the Espinomycin will transfer into the water phase. When the aqueous phase is again neutralized or made weakly alkaline, a crude sediment of Espinomycin will precipitate out. For further refining it is desirable to repeat the extraction with the above organic solvents. If necessary, by repeating the sequence of extraction with organic solvents and water, the purity of Espinomycin can be enhanced. By neutralizing or weakly alkalizing the final acid water-extracted liquid of Espinomycin which has been refined by repeating the above procedure, Espinomycin can be precipitated. When this precipitate is dried by conventional means, a powder of the Espinomycin base can be obtained.

Moreover, by freeze-drying the final acidic water extract of Espinomycin, or by separating the precipitate formed from acidifying the final solvent extract, the acid salt of Espinomycin can be obtained.

In addition to or in place of extracting by means of organic solvents, Espinomycin in a water solution (such as the culture liquid) can be adsorbed onto active carbon, and eluted by means of acidic or neutral water, alcohols, or acetone. Since Espinomycin is a basic substance, aqueous solutions of Espinomycin can be adsorbed onto suitable ion-exchange substances such as ion-exchange resins.

In order to isolate Espinomycin B, the final acid in water extract of Espinomycin is neutralized, followed by extraction with a low polarity organic solvent such as benzene. By concentrating the material under reduced pressure and keeping it in a cool state, needle-like crystals of Espinomycin B can be obtained. Espinomycin A can be obtained in a powdery form by concentrating under reduced pressure the benzene mother liquor which remains after Espinomycin B has been removed and by distilling off the benzene to yield a dry solid form of Espinomycin A.

Espinomycin A and B obtained by the above procedure can be further refined by the use of countercurrent distribution or chromatography using silica gel or alumina. For instance, when Espinomycin A is adsorbed onto a column of alumina and developed with a mixture of ethyl acetate and butyl acetate, or of acetone and benzene, Espinomycin A having a high purity is eluted. By adding organic solvents which do not dissolve this agent, such as cyclohexane or n-hexane, to the above-eluted liquid, Espinomycin A can be obtained in a crystalline form. By repeating the above refining methods or by recrystallization with proper organic solvents, both Espinomycin A and B can be isolated in the pure crystalline form.

The physicochemical properties and biological characteristics of Espinomycin A and B are shown by FIGS. 1 through 4 and in Tables 2 and 3. Table 2 shows the physicochemical properties of Espinomycin A and B, while Table 3 shows their antibiotic spectra as determined by the agar dilution method, along with those of Leucomycin complex and Josamycin which are comparatively tested.

TABLE 2

| | Espinomycin A | Espinomycin B |
|---|---|---|
| Physical form | Colorless basic prism crystal. | Colorless basic needle crystal. |
| Elemental analysis (approximate percent). | C, 60.85; H, 8.14; N, 1.73 | C, 59.07; H, 8.20; N, 1.74. |
| Molecular weight | 842 (titration) | 844 (titration). |
| Melting point, °C | 150.8 | 206.1. |
| Specific rotation $[\alpha]_D^{26}$ | −49° (c=1, chloroform) −70° (c=1, ethanol). | −40° (c=1, chloroform) −44° (c=1, ethanol). |
| Maximum absorption of ultraviolet spectrum $E_{1\ cm}^{1\%}$ | As shown in Fig. 1, 320 at 231 mμ 0.001 N—HCl. | As shown in Fig. 2, 384 at 234 mμ 0.001 N—HCl. |
| Infrared absorption spectrum. | As shown in Fig. 3 | As shown in Fig. 4. |

Solubility:
  Soluble in ethyl acetate, butyl acetate, methanol, ethanol, acetone, chloroform, benzene, ether, acidic water (Espinomycin B is hardly soluble in benzene and ether).

Hardly soluble in water, petroleum ether, cyclohexane, n-hexane, and carbon tetrachloride.

Color reactions:
  Carbomycin Test: purple; butanol layer is pale yellow
  Erythromycin Test: purple; chloroform layer is faintly pale blue
  Bromo-decolorizing Reaction: (+)
  Dragendorff Reaction: (+)
  Elson-Morgan: (—)
  Millon: (—)
  Tollens: (+)
  Fehling: (—)
  Ninhydrin: (—)

Referring now to FIGS. 3 and 4, the characteristic infrared adsorption spectra of Espinomycin A and B are presented. Espinomycin A shows characteristic adsorption peaks at 3480, 3430, 2980, 2930, 2710, 1720, 1440, 1360, 1270, 1160, 1080, 1050, 910, and 840 cm.$^{-1}$, as shown in FIG. 3. Espinomycin B, on the other hand, has characteristic adsorption peaks at 3480, 2980, 2930, 2710, 1720, 1440, 1360, 1300, 1270, 1120, 1080, 1050, 910 and 840 cm.$^{-1}$, as shown in FIG. 4. The two compounds are thus differentiated on the basis of infrared spectra, with Espinomycin A having adsorption peaks at 3430 and 1160 cm.$^{-1}$ not characteristic of Espinomycin B, while Espinomycin B shows adsorption peaks at 1300 and 1120 cm.$^{-1}$ which are not characteristic of Espinomycin A.

TABLE 3

| Tested bacteria | Minimum inhibitory concentration (mcg./ml.) | | | |
|---|---|---|---|---|
| | Espinomycin A | Espinomycin B | Leucomycin complex | Josamycin |
| Staphylococcus aureus FDA 209-P | 0.39 | 0.39 | 0.39 | 0.39 |
| Staphylococcus aureus Smith | 0.19 | 0.19 | 0.39 | 0.39 |
| Staphylococcus aureus 193 | 0.39 | 0.19 | 0.39 | 0.39 |
| Bacillus anthracis | 0.19 | 0.19 | 0.39 | 0.19 |
| Bacillus cereus | 0.78 | 0.78 | 0.78 | 0.39 |
| Bacillus brevis | 0.19 | 0.1 | 0.19 | 0.19 |
| Bacillus subtilis PCI-219 | 0.39 | 0.39 | 0.39 | 0.39 |
| Sarcina lutea | 0.024 | 0.024 | 0.024 | 0.024 |
| Micrococcus flavus | 0.19 | 0.1 | 0.39 | 0.19 |
| Corynebacterium bovis | 0.19 | 0.1 | 0.39 | 0.39 |
| Streptococcus pyogenes | 0.39 | 0.39 | 0.19 | 0.19 |
| Mycobacterium avium | 1.56 | 3.1 | 1.56 | 1.56 |
| Escherichia coli NIHJ | 100 | 100 | 100 | 100 |
| Salmonella typhosa | <100 | <100 | <100 | <100 |

In spite of the potent antibacterial activity shown in Table 3, Espinomycin A and B are not highly toxic compounds. The intravenous administration of 200 mg./kg. of Espinomycin A and B to mice resulted in no deaths.

That the low toxicity of Espinomycin was not due merely to a failure of material to be absorbed into the bloodstream was demonstrated by blood level studies. Two hours after oral administration of 400 mg./kg. of Espinomycin A and B to a group of rats, blood was collected for measuring blood level of Espinomycin A and B. In each case, 20 mg./ml. of Espinomycin were detected, suggesting a favorable absorption from the digestive tract.

The physicochemical properties and other features shown in Table 2 establish that Espinomycin A and B belong to the Macrolide antibiotics. Furthermore, the properties which exhibit a characteristic maximum ultraviolet absorption at around 232 mμ correspond to the "third group of Macrolide antibiotics," as defined by Nobuo Tanaka and Shoshiro Nakamura in the text "Outline of Antibiotics," page 100, published by the University of Tokyo Press (1967). The already known antibiotics belonging to "the third group of Macrolide antibiotics" are the Leucomycins, Josamycin, Spiramycin I, II and III, Tertiomycin A and B, Miamycin, Substance No. 446 and Foromacidin D. Table 4 shows the major physicochemical properties of these compounds compared with those of Espinomycin A and B.

TABLE 4

| Antibiotic | Melting point (° C.) | Elemental analysis (approximate percent) | | | Specific rotation (deg.) | Maximum absorption of ultraviolet spectrum (mμ.) | $E_{1\,cm.}^{1\%}$ |
|---|---|---|---|---|---|---|---|
| | | C | H | N | | | |
| Leucomycin: | | | | | | | |
| A$_3$[1] | 120–121 | 60.57 | 8.19 | 1.75 | –55.4 chloroform | 231.5 | 351 |
| A$_4$[2] | 126–127 | — | — | — | –50 chloroform | 231.5 | 375 |
| A$_5$[2] | 135–137 | — | — | — | –56 chloroform | 231.5 | 405 |
| Spiramycin: | | | | | | | |
| I[3] | 134–137 | 60.8 | 8.7 | 3.1 | –57 choroloform | 232 | 322 |
| II[3] | 130–133 | 61.6 | 8.5 | 3.1 | –55 chloroform | 232 | 307 |
| III[3] | 128–131 | 61.0 | 8.5 | 3.0 | –50 chloroform | 232 | 327 |
| Tertiomycin: | | | | | | | |
| A[4] | 202–204 | 60-09–60.1 | 8.4–8.45 | 2.49–2.79 | –49 chloroform | 233 | 216 |
| B[5] | 97–99 | 59.1 | 8.26 | 1.62 | –56 ethanol | [8] 231.278 | 237, 1.8 |
| Miamycin[3] | 221–222 | 61.45 | 8.65 | 2.32 | –18 HCl | 230 | — |
| Josamycin[6] | 130–133 | 60.63–61.55 | 8.49–8.53 | 1.77–1.75 | –70 ethanol | 232 | 325 |
| Substance No. 446[7] | 81–87 | 60.47 | 7.99 | 2.02 | –82 ethanol | [8] 230.280 | 369, 13.2 |
| Foromacidin D[3] | 135–140 | 59.85 | 8.48 | 3.35 | –75 ethanol | 231 | — |
| Espinomycin: | | | | | | | |
| A | 150.8 | 60.85 | 8.14 | 1.73 | –49 chloroform, –70 ethanol | 231 | 320 |
| B | 206.1 | 59.07 | 8.20 | 1.74 | –40 chloroform, –44 ethanol | 234 | 384 |

[1] Chemical and Pharmaceutical Bulletin Vol. 15, pp. 358–359.
[2] The Journal of Antibiotics (Japan) Vol. 20A, pp. 234–235.
[3] Index of Antibiotics From Actinomyces pp. 298, 412, 604, 605, 606, published by University of Tokyo Press (1967).
[4] The Journal of Antibiotics (Japan) Vol. 8A, pp. 105–109.
[5] The Journal of Antibiotics (Japan) Vol. 8A, pp. 161–163.
[6] The Journal of Antibiotics (Japan) Vol. 20A, pp. 174–180.
[7] The Journal of Antibiotics (Japan) Vol. 8A, pp. 164–167.
[8] Two roughly equal peaks.

NOTE. — Not reported.

It is apparent that Espinomycin is greatly different from the Spiramycins and Tertiomycin A in its nitrogen content, and also has a significantly different melting point from that of Tertiomycin B. It is also apparent that Espinomycin has significant differences with Miamycin in nitrogen content and antibiotic characteristics (*Antibiotics and Chemotherapy*, vol. 7, p. 38, 1957). Also, there is a marked difference between Espinomycin and Substance 446 in melting point; and the nitrogen content of Foromacidin D is about twice that of Espinomycin. Thus, it is apparent that Espinomycin is not identical to any of these known antibiotics on the basis of physicochemical data reported.

However, Espinomycin A is not markedly distinguishable from the components of Leucomycins and Josamycin due to closely resembling physicochemical constants, and Espinomycin B cannot be also differentiated from isoleucomycins, intermolecularly rearranged substances of the components in Leucomycins, which melt over 200° C. and are hardly soluble in benzene, more particularly described in the *Journal of Antibiotics* (Japan), vol. 21, p. 535. Therefore, a comparative test employed the following means.

TABLE 5
[R$_f$-values due to thin layer chromatography]

| Solvents | Silica gel (Wakogel B-5) ascending method | | | | |
|---|---|---|---|---|---|
| | Espinomycin | | Leucomycin | | Josamycin |
| | A | B | A$_3$ | A$_4$ | |
| Ethyl acetate:Butyl acetate, 1:1 | 0.38 | | 0.49 | 0.42 | 0.46 |
| Ethyl acetate:Butyl acetate, 5:3 | 0.46 | | | | 0.56 |
| Ethyl acetate:Benzene, 3:1 | 0.60 | 0.48 | 0.65 | 0.60 | |

As shown in the $R_f$ values of Table 5 and in the thin layer chromatography shown in FIG. 5, a mixture of Espinomycin A and Josamycin was dotted at one end of a thin layer of silica gel, and was developed by means of a mixture of ethyl acetate and butyl acetate. Two distinctly separated spots are observed which separated with favorable reproduction. Also, the fatty acids of Espinomycin A formed by alkaline hydrolysis which is used for the following comparison with Leucomycins, are entirely different from those of Josamycin obtained by the same procedure. There is also a difference observed in the absorption at 3430 cm.$^{-1}$, 1235 cm.$^{-1}$, and 915 cm.$^{-1}$ by infrared spectroscopy. Thus, this data establishes that Espinomycin A is indeed a different agent from Josamycin. According to the literature data, the various kinds of fatty acids shown in Table 6 exist as esters in each molecule of the eight components of Leucomycins (*Journal of Antibiotics*, Japan, vol. 21. p. 534):

TABLE 6

| Each component of Leucomycin: | Kinds of Fatty Acid and mol-number |
|---|---|
| $A_1$ | Iso-valeric acid 1 mol. |
| $A_3$ | Iso-valeric acid 1 mol, acetic acid 1 mol. |
| $A_5$ | Butyric acid 1 mol, acetic acid 1 mol. |
| $A_4$ | Butyric acid 1 mol. acetic acid 1 mol. |
| $A_7$ | Propionic acid 1 mol. |
| $A_6$ | Propionic acid 1 mol, acetic acid 1 mol. |
| $A_9$ | Acetic acid 1 mol. |
| $A_8$ | Do. |

Iso-leucomycins are intramolecularly rearranged Leucomycins; therefore, the fatty acid composition is the same as that of each corresponding Leucomycin.

In view of this, in order to make a direct comparison between the fatty acids of the Leucomycins and that of Espinomycin, Espinomycin A and Espinomycin B were saponified and the resultant fatty acids detected by thin layer chromatography. The results indicated that propionic acid alone was formed. This was confirmed by gas-chromatography, which proved that 2 moles of propionic acid were formed from both Espinomycin A and Espinomycin B. Therefore, it is apparent that both Espinomycin A and B are clearly differentiated from any component of Leucomycins for which fatty acids and mol-numbers are listed in Table 6. Thus, it can be concluded that Espinomycin A and B are clearly distinguishable from all of the known Macrolide antibiotics as well as other known antibiotics, being a new antibiotic agent.

While this invention is explained more concretely in the following Examples, it will be clear to those skilled in the art that mutant strains and modified methods for preparing the Espinomycins, although not mentioned in the Examples, can be utilized. Various conditions known to be suitable for cultivating the Actinomyces are known in the art, and the above disclosed characteristics of Espinomycin A and B will enable those skilled in the art to make modifications from the illustrative Examples presented.

EXAMPLE 1

16 liters of an aqueous neutral (pH 7.0) culture medium was prepared containing 1% glucose, 0.5% peptone, 0.5% corn steep liquor, 0.2% NaCl, 0.2% calcium carbonate, and 15 ml. of a silicon oil anti-foam. The media was put into a 30 liter stainless steel culture tank and sterilized for 20 minutes at 120° C. The N–18–90 strain was then inoculated and fermentation was carried out in 27° C. for 69 hours with agitation at 300 r.p.m. and aeration at the rate of 15 liters per minute. The end of fermentation, the antimicrobial activity of the fermented broth shows an inhibitory zone 28.8 mm. in diameter against *Bacillus subtilis* PCI–219 by the cup-plate method. The culture broth was adjusted to a pH of 4 with hydrochloric acid, heated to 70° C., and immediately cooled, and then filtered with addition of 300 grams of diatomaceous earth as a filtering adjuvant. There were recovered 11.5 liters of filtrate, the anti-microbial activity of which showed an inhibitory zone against *Bacillus subtilis* PCI–219 28.5 mm. in diameter by the cup-plate method. The filtrate was adjusted to a pH of 7 with 21% NaOH, and extracted by adding 8.0 liters of ethyl acetate. 6.9 liters of ethyl acetate extract were obtained, which was then concentrated under reduced pressure to a volume of 160 ml., while being kept below 50° C. The concentrate thus obtained was extracted with 160 ml. of acidic water which was adjusted to pH 2.0 by using 1 N hydrochloric acid. The aqueous portion was separated, followed by neutralizing to a pH of 7.0, resulting in the formation of white cotton-like sediments, which were then dried under reduced pressure. 575 mg. of a crude Espinomycin powder having a slightly brown color was obtained. At a concentration of 500 mg. per ml., this substance gave an anti-bacterial activity 32 mm. in diameter against *Bacillus subtilis* PCI–219 by the cup-plate method.

EXAMPLE 2

100 liters of a culture medium composed of 2% soybean meal 1.5% starch, 0.5% glucose, 0.1% peptone, 0.1% dried yeast, 0.3% NaCl, 0.2% sodium nitrate, 0.2% calcium carbonate, and 20 ml. of silicone oil anti-foam agent was adjusted to a pH of 7.0. The culture medium was put into a 300 liter stainless steel fermenter and sterilized for 30 minutes at 120° C. The N–18–90 strain of *Streptomyces fungicidicus* var. *espinomycerticus* was then inoculated, and fermentation was carried out at 27° C. for 66 hours with continuous agitation at 210 r.p.m. and with aeration at the rate of 100 liters of sterile air per minute. At the end of the fermentation, the harvested broth showed an inhibitory zone against *Bacillus subtilis* PCI–219 having a diameter of 35.0 mm., using the cup-plate method. The pH of the broth was then adjusted to 3 while adding 2 kg. of diatomaceous earth, and filtered with a filter press. 90 liters of filtrate was recovered. The pH of the filtrate was then adjusted to 8 by the use of sodium hydroxide, and extracted by the addition of 60 liters of ethyl acetate. The ethyl acetate extract was concentrated under reduced pressure to a volume of 600 ml. maintaining the bath temperature less than 50° C. The concentrate was extracted with 600 ml. of water, and adjusted to pH 2 with hydrochloric acid, whereby Espinomycin transferred to the acidic water phase. The resulting acidic aqueous solution was then adjusted to a pH of 8 using 1 N NaOH, and extracted with 640 ml. of butyl acetate. The material was again transferred with the same procedure as above into 600 ml. of acidic water which was, after following separation, adjusted to a pH of 7.0 with 1 N NaOH. Thus, a light brown cotton-like sediment was produced. 36.2 g. of Espinomycin was obtained by drying these sediments under reduced pressure. This powder at a concentration of 500 mcg./ml. showed an inhibitory zone against *Bacillus subtilis* PCI–219 31.0 mm. in diameter.

EXAMPLE 3

35 g. of crude Espinomycin powder obtained by the same method as described in Example 2 was dissolved in 100 ml. of ethyl acetate. The ethyl acetate was substituted gradually with benzene, which was concentrated and left standing, whereby 8.76 grams of needle-like crystals of Espinomycin B were obtained. These crystals were recrystallized with hot benzene, and 6.1 grams of colorless, needle-like crystals of Espinomycin B were recovered having a melting point of 206.4° C. These crystals inhibited the growth of *Bacillus subtilis* PCI–219 at a concentration of 0.39 mcg./ml. and also inhibited the growth of *Staphylococcus aureus* FDA 209–P at a concentration of 0.2 mcg./ml. The Espinomycin B crystals were removed from the above-mentioned benzene solution, and the mother liquor was evaporated and dried under reduced pressure. 22.52 g. of Espinomycin A powder were obtained by this procedure.

EXAMPLE 4

8 grams of Espinomycin A crude powder obtained by the method of Example 3 were dissolved in a slight amount of ethyl acetate and put on alumina chromatography. 500 grams of alumina for a Brockman chromatograph were filled into a glass tube 4 cm. in diameter by the use of ethyl acetate. The ethyl acetate solution of Espinomycin A was then poured into the upper part of the column and eluted with 3 liters of ethyl acetate. The eluate solution was separately collected with a fraction collector, and each fraction was put on silica gel thin layer chromatography to monitor the purity. The fractions containing Espinomycin A were combined, and evaporated to dryness under reduced pressure. By dissolving the dry material in three parts of benzene, followed by adding cyclohexane gradually, 3.05 grams of crystalline Espinomycin A powder were obtained. As a result of recrystallization by the above technique, 2.76 grams of prism-like crystals of Espinomycin A were yielded.

EXAMPLE 5

685 mg. of crystalline Espinomycin A obtained by the same method as Example 4 where dissolved in a slight amount of benzene and subjected to silica gel chromatography. 400 grams of silica gel (Wakogel C-200) was filled in a glass tube having an inner diameter of 2.9 cm. with the aid of benzene. The above-mentioned Espinomycin A solution in benzene was then added, and developed and eluted with 2800 ml. of a solvent prepared by mixing 1 part benzene with 3 parts of ethyl acetate. A fraction collector was used to collect the eluate, and aliquots of each part were taken to monitor purity using thin layer chromatography on silica gel. The eluted fractions containing Espinomycin A were combined, evaporated and dried under reduced pressure, and dissolved in a small quantity of benzene. By adding cyclohexane, there were obtained prism-like crystals of Espinomycin A weighing 270 mg. which gave a single spot by thin layer chromatography on silica gel plates. The melting point of this crystal was 150.8° C. Also, solutions of this crystal at a concentration of 0.78 mcg./ml. inhibited the growth of Bacillus subtilis PCI-219. Solutions of this crystal at a concentration of 0.39 mcg/ml. inhibited the growth of Staphylococcus aureus FDA 209–P.

EXAMPLE 6

200 mg. of Espinomycin A crystals obtained by the same method as in Example 5 were dissolved in 5 ml. of ether. To this solution, an ether saturated with tartaric acid was added until precipitation ceased. After being left standing overnight, the sediment was washed with ether and dried. 175 mg. of tartrate salt of Espinomycin A was obtained, having a melting point of 148.6° C.

It will be appreciated that while the foregoing disclosure relates only to a preferred embodiment of the invention, numerous modifications or alterations may be made by those skilled in the art without departing from the spirit and scope of the invention as set forth in the appended Claims.

What is claimed and desired to be secured by Letters Patent is:

1. The antibiotic Espinomycin A possessing the following characteristics:

(a) physical form: colorless, basic, prism-like crystals;
    (b) elemental analysis: (approximate percent): C 60.85; H 8.14; N 1.73;
    (c) molecular weight: 842 (titration);
    (d) melting point: 150.8° C.;
    (e) specific rotation $[\alpha]_D^{26}$: —49° (c.=1, chloroform); —70° (c.=1, ethanol);

($E_{1cm}^{1\%}$) 320 at 231 m$\mu$, (f) ultraviolet spectra maximum absorption of 0.001 N-hydrochloric acid;
    (g) characteristic absorption of infrared spectrum (cm.$^{-1}$) at 3480, 3430, 2980, 2930, 2710, 1720, 1440, 1360, 1270, 1160, 1080, 1050, 910 and 840;
    (h) solubility: soluble in ethyl acetate, butyl acetate, methanol, ethanol, acetone, chloroform, benzene, ether and acidic water; hardly soluble in water, petroleum ether, cyclohexane, n-hexane and carbon tetrachloride;
    (i) color reactions:
        Carbomycin test: purple; butanol layer is pale yellow; Erythromycin test: purple; chloroform layer is faintly pale blue; Bromo-decolorizing reaction (+); Dragendorff reaction (+); Tollens (+); Elson-Morgan (—); Millon (—); Fehling (—); Ninhydrin (—);
    (j) $R_f$-values on silica gel thin layer chromatography:
        ethyl acetate:butyl acetate=1:1 _____ 0.38
        ethyl acetate:butyl acetate=5:3 _____ 0.46
        ethyl acetate:benzene=3:1 _____ 0.60
    (k) producing 2 moles of propionic acid on alkaline hydrolysis.

2. Espinomycin A according to Claim 1 which is in the form of a pharmaceutically acceptable salt thereof.

3. The antibiotic Espinomycin B possessing the following characteristics:

(a) physical form: colorless, basic, needle-like crystals;
    (b) elemental analysis: (approximate percent): C 59.07, H 8.20, N 1.74;
    (c) molecular weight: 844 (titration);
    (d) melting point: 206.1° C.;
    (e) specific rotation $[\alpha]_D^{26}$: —40° (c.=1, chloroform); —44° (c.=1, ethanol);
    (f) ultraviolet spectra maximum absorption of ($E_{1cm}^{1\%}$) 384 at 234 m$\mu$, 0.001 N-hydrochloric acid;
    (g) characteristic absorption of infrared spectrum (cm.$^{-1}$) at 3480, 2980, 2930, 2710, 1720, 1440, 1360, 1300, 1270, 1120, 1080, 1050, 910 and 840;
    (h) solubility properties: soluble in ethyl acetate, butyl acetate, methanol, ethanol, acetone, chloroform and acidic water; hardly soluble in benzene, ether, water, petroleum ether, cyclohexane, n-hexane and carbon tetrachloride;
    (i) color reactions:
        Carbomycin test: purple; butanol layer is pale yellow; Erythromycin test: purple; chloroform layer is faintly pale blue; Bromo-decolorizing reaction (+); Dragendorff reaction (+); Tollens (+); Elson-Morgan (—); Millon (—); Fehling (—); Ninhydrin (—);
    (j) $R_f$-values on silica gel thin layer chromatography:
        ethyl acetate:benzene=3:1—$R_f$=0.48;
    (k) producing 2 moles of propionic acid on alkaline hydrolysis.

4. Espinomycin B according to Claim 1 which is in the form of a pharmaceutically acceptable salt thereof.

5. A process for producing Espinomycin which comprises cultivating Streptomyces ATCC #21574 under aerobic conditions in a medium containing a source of carbon and a source of nitrogen, until sufficient antibacterial activity has been imparted to said medium.

6. A process for producing Espinomycin A which comprises cultivating Streptomyces ATCC #21574 under aerobic conditions in a medium containing a source of carbon and a source of nitrogen until sufficient antibacterial activity has been imparted to said medium and recovering the Espinomycin A.

7. A process for producing Espinomycin B which comprises cultivating Streptomyces ATCC #21574 under aerobic conditions in a medium containing a source of carbon and a source of nitrogen until sufficient antibacterial activity has been imparted to said medium and recovering the Espinomycin B.

8. Espinomycin produced by the process of Claim 5.

References Cited

The Merck Index, 8th edition, Merck & Co., Inc., Rahway, N.J., 1968, p. 617.

JEROME D. GOLDBERG, Primary Examiner

U.S. Cl. X.R.

424—121; 195—80